(12) United States Patent
Baker

(10) Patent No.: US 11,554,560 B2
(45) Date of Patent: Jan. 17, 2023

(54) PERIMETER PLATES FOR WIND TURBINE BLADE MANUFACTURING

(71) Applicant: TPI Composites, Inc., Warren, RI (US)

(72) Inventor: Kirk M. Baker, Broomfield, CO (US)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 17/306,493

(22) Filed: May 3, 2021

(65) Prior Publication Data

US 2021/0252802 A1 Aug. 19, 2021

Related U.S. Application Data

(63) Continuation of application No. 16/129,478, filed on Sep. 12, 2018, now Pat. No. 10,994,496.

(60) Provisional application No. 62/667,059, filed on May 4, 2018.

(51) Int. Cl.
  *B29C 70/44* (2006.01)
  *B29C 65/00* (2006.01)
  *B29C 70/54* (2006.01)
  *B29L 31/08* (2006.01)

(52) U.S. Cl.
  CPC ........ *B29C 70/443* (2013.01); *B29C 66/7212* (2013.01); *B29C 70/54* (2013.01); *B29L 2031/085* (2013.01)

(58) Field of Classification Search
  CPC ....... B29C 70/443; B29C 70/44; B29C 70/48; B29C 2043/3655; B29C 70/549; Y02P 70/50; Y02E 10/72; B29L 2031/085; Y10T 29/49337; B23P 15/04; F03D 1/0675
  See application file for complete search history.

(56) References Cited

U.S. PATENT DOCUMENTS

| | | | |
|---|---|---|---|
| 3,434,411 A | 3/1969 | Allen | |
| 4,086,378 A * | 4/1978 | Kam | B29C 70/22 428/36.1 |
| 4,311,661 A | 1/1982 | Palmer | |

(Continued)

FOREIGN PATENT DOCUMENTS

| | | |
|---|---|---|
| EP | 0922336 A1 | 6/1999 |
| JP | 07047595 A * | 2/1995 |
| WO | WO-2019/212587 A1 | 11/2019 |

OTHER PUBLICATIONS

Extended European Search Report for EP Application No. 18917240.6 dated Nov. 29, 2021.

(Continued)

*Primary Examiner* — Jason L Vaughan
(74) *Attorney, Agent, or Firm* — Stephen J. Kenny; Vincenzo DiMonaco; Foley Hoag, LLP

(57) ABSTRACT

A method of manufacturing a composite structure, e.g. wind turbine blade, using reusable and removable perimeter plates to establish air flow channels in conjunction with a vacuum bag and mold. An exemplary setting is the perimeter of large wind blade shells where a perimeter vacuum is used to retain the part in the mold for the bonding process. The reusable plates disclosed herein create air channels whether the vacuum is introduced to the perimeter of the mold: i) through the flange in different locations; or ii) with the use of vacuum lines into the perimeter bag; or iii) built in vacuum channels in the flange of the mold.

18 Claims, 14 Drawing Sheets

(56) References Cited

U.S. PATENT DOCUMENTS

| | | | | |
|---|---|---|---|---|
| 4,942,013 | A * | 7/1990 | Palmer | B29C 43/3642 |
| | | | | 264/511 |
| 5,242,523 | A * | 9/1993 | Willden | B29C 70/44 |
| | | | | 244/119 |
| 5,451,377 | A * | 9/1995 | Asher | B29C 70/446 |
| | | | | 428/172 |
| 5,520,532 | A | 5/1996 | Reinfelder et al. | |
| 5,716,488 | A * | 2/1998 | Bryant | B29C 70/44 |
| | | | | 425/389 |
| 6,116,539 | A * | 9/2000 | Williams | B64C 3/26 |
| | | | | 244/45 R |
| 6,656,411 | B1 * | 12/2003 | McClure | B29C 70/547 |
| | | | | 264/510 |
| 6,889,937 | B2 * | 5/2005 | Simpson | B64C 3/24 |
| | | | | 244/119 |
| 7,204,951 | B2 * | 4/2007 | Simpson | B29C 70/342 |
| | | | | 264/573 |
| 7,726,962 | B2 * | 6/2010 | Aramburu | B29C 33/38 |
| | | | | 425/117 |
| 7,850,897 | B2 * | 12/2010 | Ashton | B29C 70/342 |
| | | | | 264/342 R |
| 8,221,666 | B2 * | 7/2012 | Mikkelsen | B29C 70/443 |
| | | | | 425/389 |
| 8,440,120 | B2 * | 5/2013 | Mikkelsen | B29C 70/443 |
| | | | | 264/102 |
| 8,545,744 | B2 | 10/2013 | Jones | |
| 8,919,696 | B2 * | 12/2014 | Lonsdorfer | B64C 1/12 |
| | | | | 244/119 |
| 8,940,213 | B2 * | 1/2015 | Lockett | B29C 70/42 |
| | | | | 264/316 |
| 9,073,273 | B2 * | 7/2015 | Guru Prasad | B29C 70/48 |
| 9,481,115 | B2 * | 11/2016 | Funnell | B29C 33/48 |
| 9,623,620 | B2 | 4/2017 | Brizon et al. | |
| 9,682,514 | B2 * | 6/2017 | Lockett | B29C 70/549 |
| 9,751,239 | B2 * | 9/2017 | Murai | B29C 70/30 |
| 9,895,849 | B2 | 2/2018 | Smith et al. | |
| 9,931,795 | B2 | 4/2018 | Lutz | |
| 10,427,778 | B2 * | 10/2019 | Connelly | B64D 33/04 |
| 10,738,759 | B2 * | 8/2020 | Caruso | B29C 51/266 |
| 10,751,982 | B2 * | 8/2020 | Wang | B32B 37/0053 |
| 10,994,496 | B2 | 5/2021 | Baker | |
| 2004/0017020 | A1 * | 1/2004 | Loving | B29C 70/547 |
| | | | | 425/388 |
| 2005/0152139 | A1 * | 7/2005 | Loving | B32B 5/22 |
| | | | | 264/258 |
| 2006/0068170 | A1 | 3/2006 | Hanson | |
| 2008/0044506 | A1 * | 2/2008 | Zahlen | B29C 70/548 |
| | | | | 425/130 |
| 2008/0182054 | A1 | 7/2008 | Ridges et al. | |
| 2008/0237909 | A1 | 10/2008 | Bech | |
| 2009/0039566 | A1 | 2/2009 | Rodman | |
| 2011/0100540 | A1 * | 5/2011 | Mathew | B29D 99/0014 |
| | | | | 156/245 |
| 2011/0103965 | A1 * | 5/2011 | Mathew | F03D 1/0675 |
| | | | | 416/233 |
| 2012/0090789 | A1 * | 4/2012 | Starke | B29C 33/301 |
| | | | | 264/219 |
| 2012/0090790 | A1 * | 4/2012 | Starke | B29C 33/301 |
| | | | | 29/592 |
| 2015/0129136 | A1 | 5/2015 | Dull et al. | |
| 2015/0137424 | A1 | 5/2015 | Lyons et al. | |
| 2017/0276118 | A1 | 9/2017 | Mashue et al. | |

OTHER PUBLICATIONS

Highlandboxes, "Making Resin Casting Moulds," https://www.youtube.com/watch?v=9oGZ1IVL7oY (2017).

International Preliminary Report on Patentability for International Application No. PCT/US2018/050667 dated Nov. 10, 2020.

International Search Report and Written Opinion for International Application No. PCT/US18/50667 dated Nov. 23, 2018.

Smooth-On, "Resin Infusion Demo: Wind Blades Made with Custom Vacuum Bag," https://www.youtube.com/watch?v=XVj_YyvgMbE (2011).

\* cited by examiner

Shown transparent to show cuts on both sides.

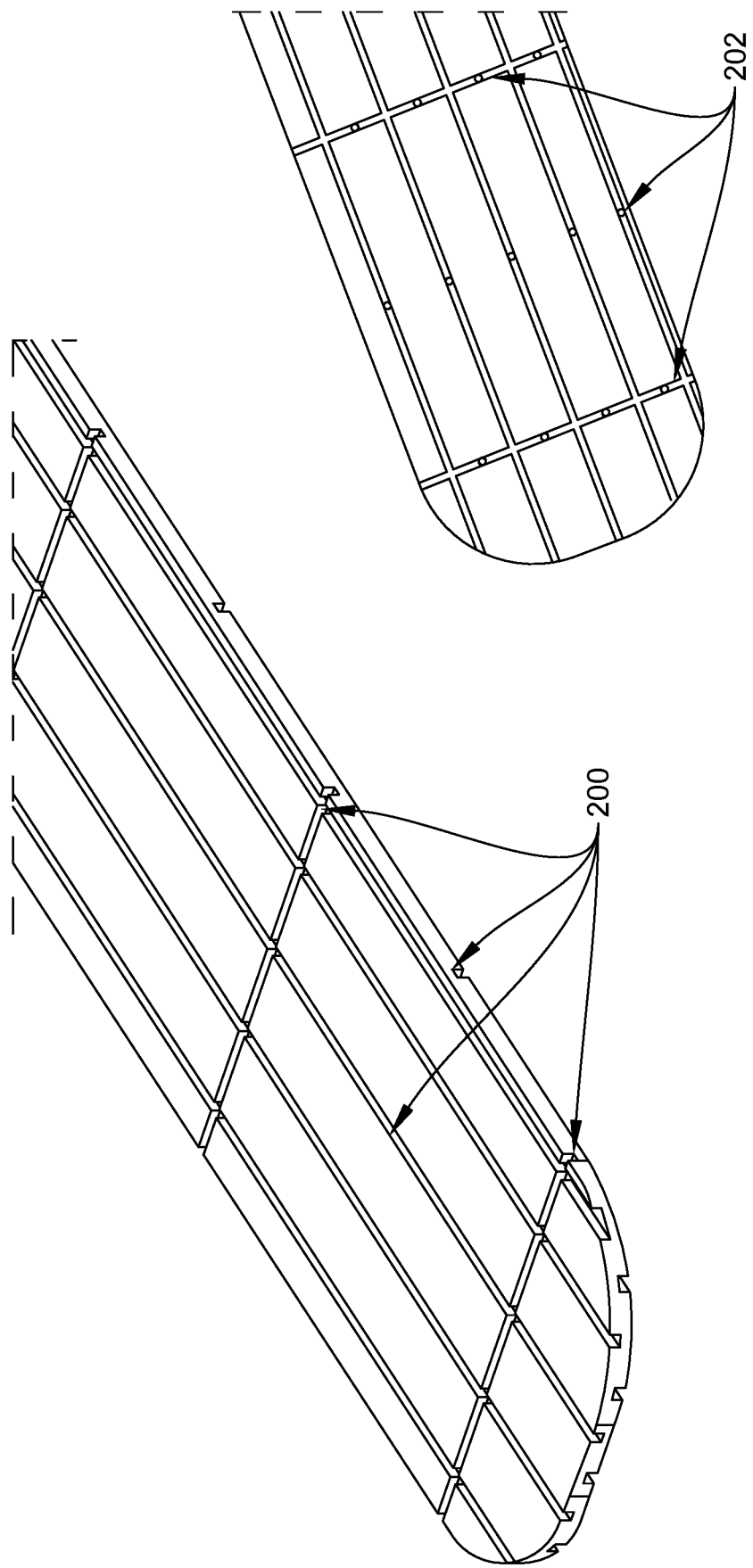

- Before draw down
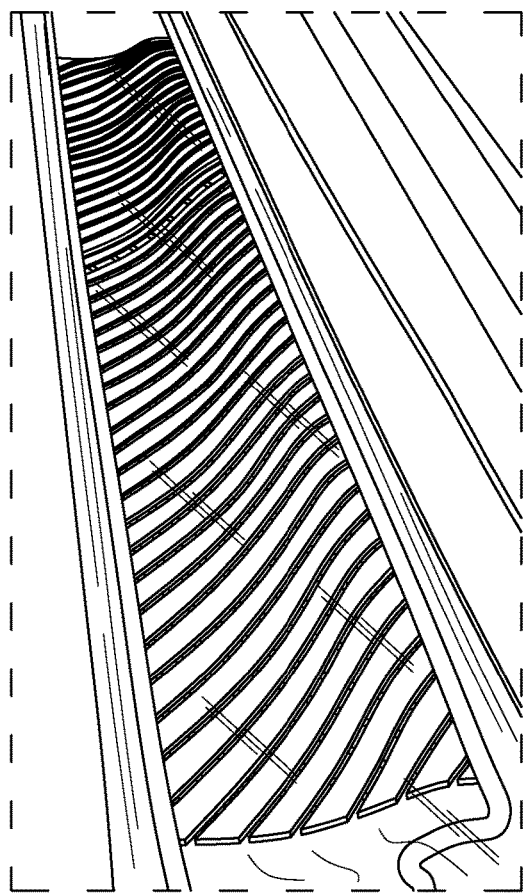
- After draw down
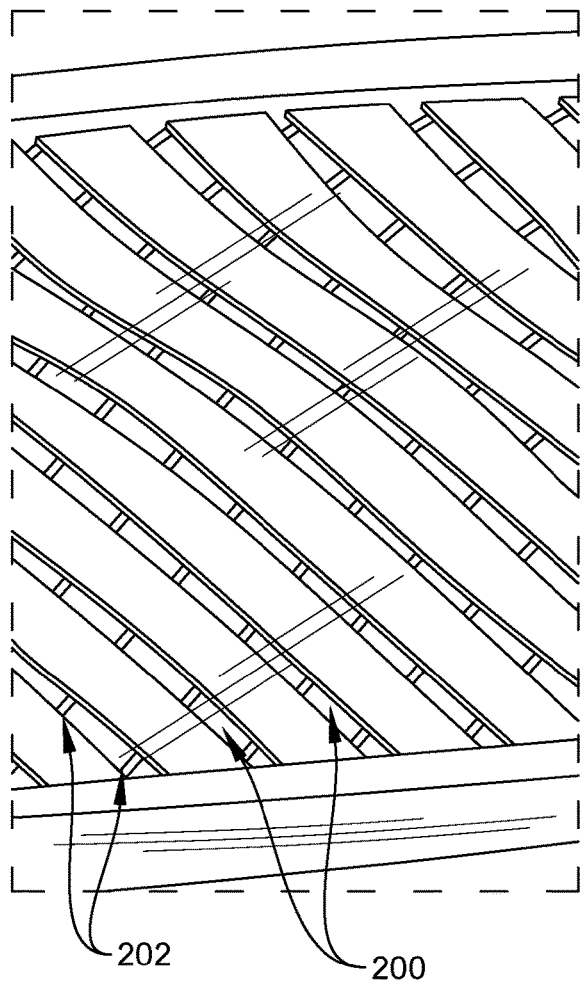
FIG. 14A
FIG. 14B

PERIMETER PLATES FOR WIND TURBINE BLADE MANUFACTURING

CROSS-REFERENCE TO RELATED APPLICATIONS

This application is a Continuation of and claims the benefit of priority under 35 USC 120 to U.S. patent application Ser. No. 16/129,478 filed Sep. 12, 2018, which claims the benefit under 35 USC 119 of priority to U.S. Provisional Application No. 62/667,059 filed May 4, 2018, the entire contents of which are hereby incorporated by reference.

THE BACKGROUND OF THE DISCLOSED SUBJECT MATTER

Field of the Disclosed Subject Matter

The disclosed subject matter relates to a system and corresponding method for the manufacture of fiber reinforced polymer composite manufacturing, e.g., wind turbine blades. Particularly, the present disclosed subject matter provides reusable plate(s) to provide an air path under a perimeter of the vacuum bag employed during manufacture of composite products.

Description of Related Art

A variety of methods and systems are known for the manufacture of wind turbine blades. Generally, Vacuum Assisted Resin Transfer Molding (VARTM) process is widely used in the manufacture of wind turbine blades because of the lower cost compared to autoclaving. During the process of filling the mold, a vacuum which is under-pressure or negative pressure, is generated via vacuum outlets in the mold cavity, whereby liquid polymer is drawn into the mold cavity via the inlet channels in order to fill the mold cavity. From the inlet channels the polymer disperses in all directions in the mold cavity due to the negative pressure as a flow front moves towards the vacuum channels. Vacuum infusion techniques typically employ a rigid mold part and a resilient mold part in the form of a vacuum bag.

Resin transfer molding (RTM) is a manufacturing method, which is similar to VARTM. In RTM the liquid resin is not drawn into the mold cavity due to a vacuum generated in the mold cavity. Instead the liquid resin is forced into the mold cavity via an overpressure at the inlet side.

Prepreg molding is a method in which reinforcement fibers are pre-impregnated with a pre-catalysed resin. The resin is typically solid or near-solid at room temperature. The prepregs are arranged by hand or machine onto a mold surface, vacuum bagged and then heated to a temperature, where the resin is allowed to reflow and eventually cured. This method has the main advantage that the resin content in the fiber material is accurately set beforehand. The prepregs are easy and clean to work with and make automation and labor saving feasible. The disadvantage with prepregs is that the material cost is higher than for non-impregnated fibers. Further, the core material need to be made of a material, which is able to withstand the process temperatures needed for bringing the resin to reflow. Prepreg molding may be used both in connection with a RTM and a VARTM process.

Some exemplary infusion techniques are disclosed in U.S. Pat. Nos. 9,599,094 and 8,123,883, the entirety of each is hereby incorporated by reference. Such conventional techniques require running a perimeter bag along the edges of the both the upper or suction side (SS) blade mold and the lower or pressure side (PS) blade mold and place rope with breather cloth sewn around it all the way around the mold. Next, it is also required to add a layer of breather cloth over the aforementioned subassembly, and extend the breather cloth layer all the way around the mold. Also, a non-sanding tape is placed on one half of the mold along the leading edge. In the convention approach, all of these materials/layers are required to provide air channels to help remove air when the plastic perimeter bag is placed from part to mold. However, the problem with this, is all this material is thrown away on each build, often at a cost of several hundreds of dollars per blade.

There thus remains a need for an efficient and economic method and system for establishing air channels to facilitate air removal when the plastic perimeter bag is placed from part to mold.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method of manufacturing a wind turbine blade comprising: providing a plurality of removable plates, the removable plates disposed along at least one of the leading edge and trailing edge of the wind turbine blade mold, at least one removable plate having a plurality of channels formed therein, wherein the removable plate(s) are configured to establish air flow channels in conjunction with a vacuum bag and mold; proving a vacuum seal around the perimeter of the blade mold; and removing air from the mold through the channels in the removable plate(s).

In some embodiments, the removable plate(s) are disposed on a high pressure side of the blade mold, disposed along the trailing edge, and/or disposed at approximately the 4 meter position on the leading edge.

In some embodiments, a first plate is formed to exhibit a greater rigidity than a second plate, with the first plate is approximately 5 inches wide and 48 inches long, and second plate is approximately 8 inches wide and 60 inches long. Also, the first plate can remain generally planar during removal of air while the second plate conforms to a contoured geometry during removal of air.

In some embodiments, the method further comprises providing tip plates, the tip plates engaging the leading and trailing edge plate(s). Additionally, the removable plates can include channels formed in both upper and lower side surfaces.

In accordance with another aspect of the disclosure, an apparatus for forming a wind turbine blade comprises: a plurality of removable plates, the removable plates configured to be disposed along at least one of the leading edge and trailing edge of the wind turbine blade mold, at least one removable plate having a plurality of channels formed therein, wherein the removable plate(s) are configured to establish air flow channels for removal of air within a vacuum bag and mold.

In some embodiments, the channels are formed at approximately a 45° angle with respect to a lower edge of the removable plate; and/or the channels are uniformly spaced a distance of approximately 5 inches apart across the surface of the removable plate.

In some embodiments, at least one channel is formed with a different depth than another channel, e.g., the channel depth is half the width of the removable plate. In some embodiments, the removable plates include channels formed in both upper and lower surfaces, such that through holes are formed at intersections of channels on the upper surface of the removable plate with channels on the lower surface of the removable plate.

In some embodiments, a plurality of channels can be formed on each surface of the removable plate, a first channel having a first orientation and a second channel having a different orientation.

In some embodiments, the apparatus further includes removable tip plates having a generally v-shaped profile, the removable tip plates disposed in an abutting configuration with the removable plate(s). In some embodiments, the removable plates are made from at least one of a high-density polyethylene (HDPE), PPG based polyether elastomeric polyurethane and/or combinations thereof.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 2-14B depict an exemplary embodiment of removable and reusable plate(s) for use in conjunction with a vacuum bag for manufacture of a wind turbine blade.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
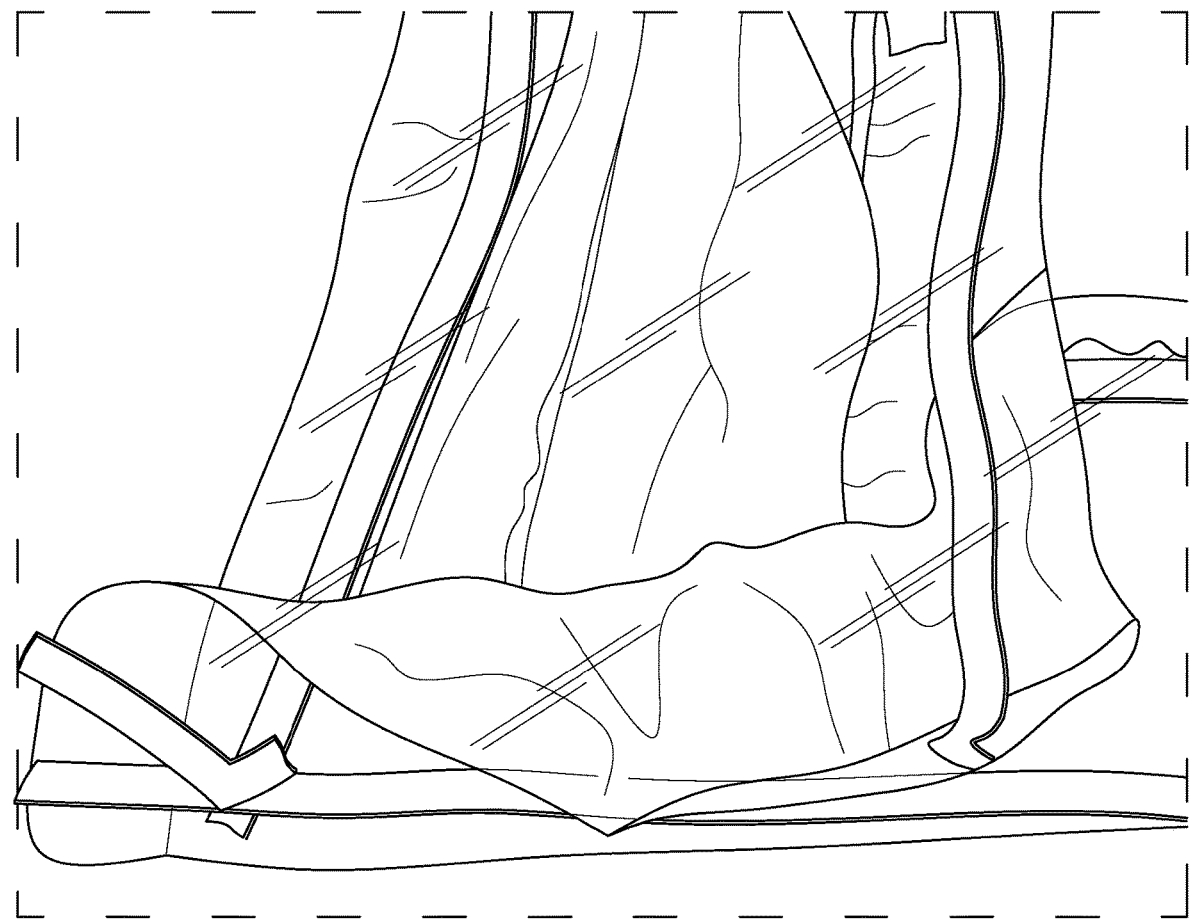
FIG. 1 depicts an conventional vacuum bag employed during manufacture of a wind turbine blade.

A method of establishing air channels in conjunction with a vacuum bag in a composite mold (e.g. wind turbine blade), is shown in FIG. 1 wherein after a blade shell is debagged, a rope and breather cloth is placed around the mold. Next, a perimeter bag is required to provide vacuum to hold the composite shell in place. All of these consumable materials must then be removed and discarded as they do not provide sufficient integrity to be recycled or reused.

In accordance with an aspect of the present disclosure, these consumable materials are replaced with a plate(s) having a surface structure which creates air channels for air to flow within and throughout the vacuum bag, and allow for removal of air from an inlet/outlet (e.g. valve), typically disposed at an edge of the vacuum bag. This reduces waste, is faster to install and remove, and is reusable for numerous blade builds. An additional advantage of this novel apparatus and method is that the reusable plates can be used on all blade models, and for an indefinite period of time.

An exemplary embodiment(s) of the reusable plate is shown in FIGS. 2-14B. The length and width of each plate is determined by: i) flange width of the mold; and ii) to maximize ease of installation and removal while accounting for mold features which present obstacles when removing the plates.

In some wind turbine blade molds, clamps are positioned every two meters around the majority of the mold and have a flange width of 200 mm. In such applications, a first (e.g. plastic) plate can be 5 inches wide by 48 inches long, and second (silicone) plate 8 inches wide and 60 inches long silicone can be employed. The first plate is formed to exhibit a greater rigidity than the second plate, with the first plate positioned on a flat surface covered by the bagging material. The second plate extends from a flat surface to an inclined surface (i.e. clamp edge) and thus requires sufficient flexibility to adapt to the non-linear contours of the underlying surface (as shown in FIGS. 14A-B).

Figure 2:
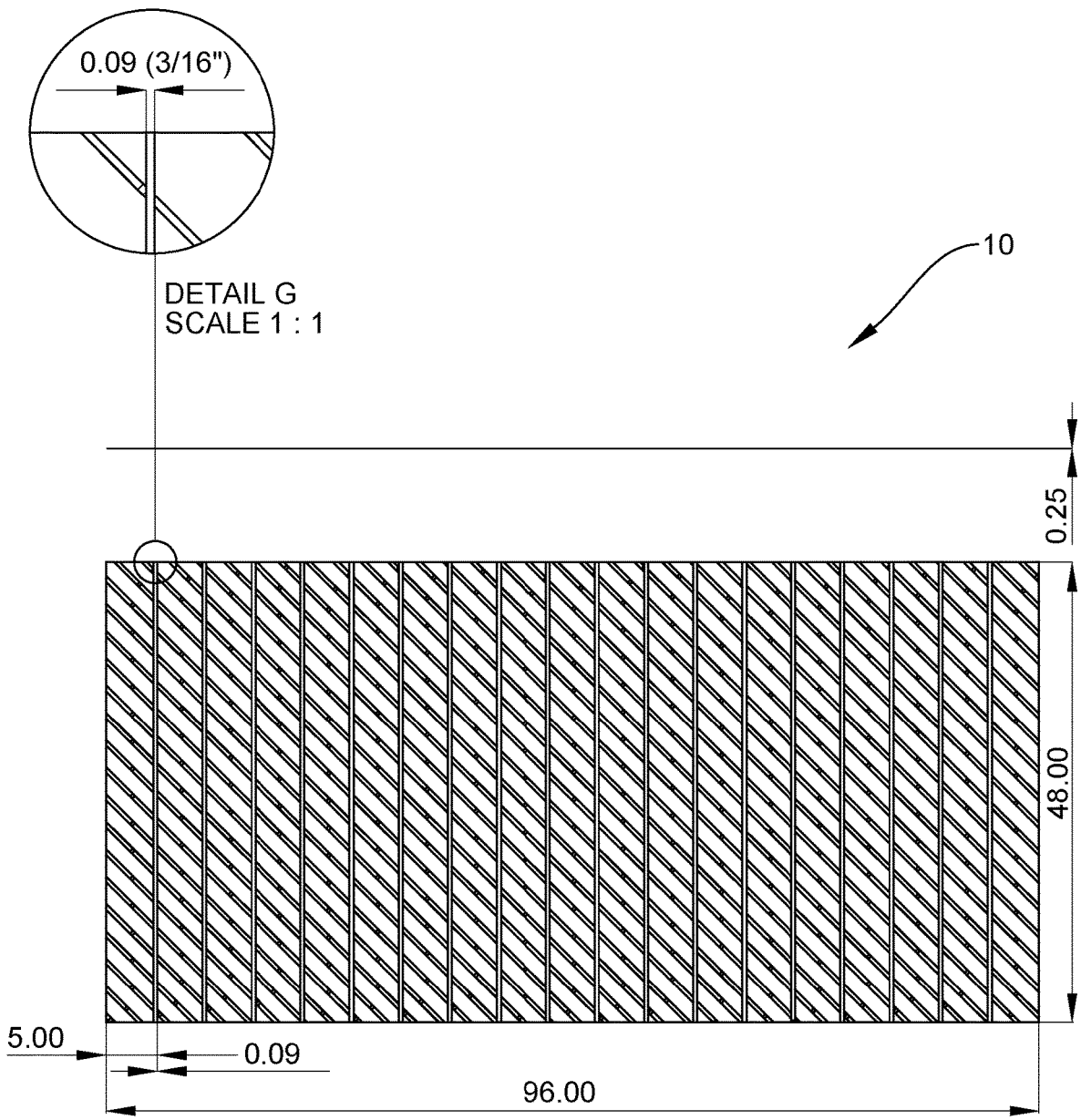
Figure 3:
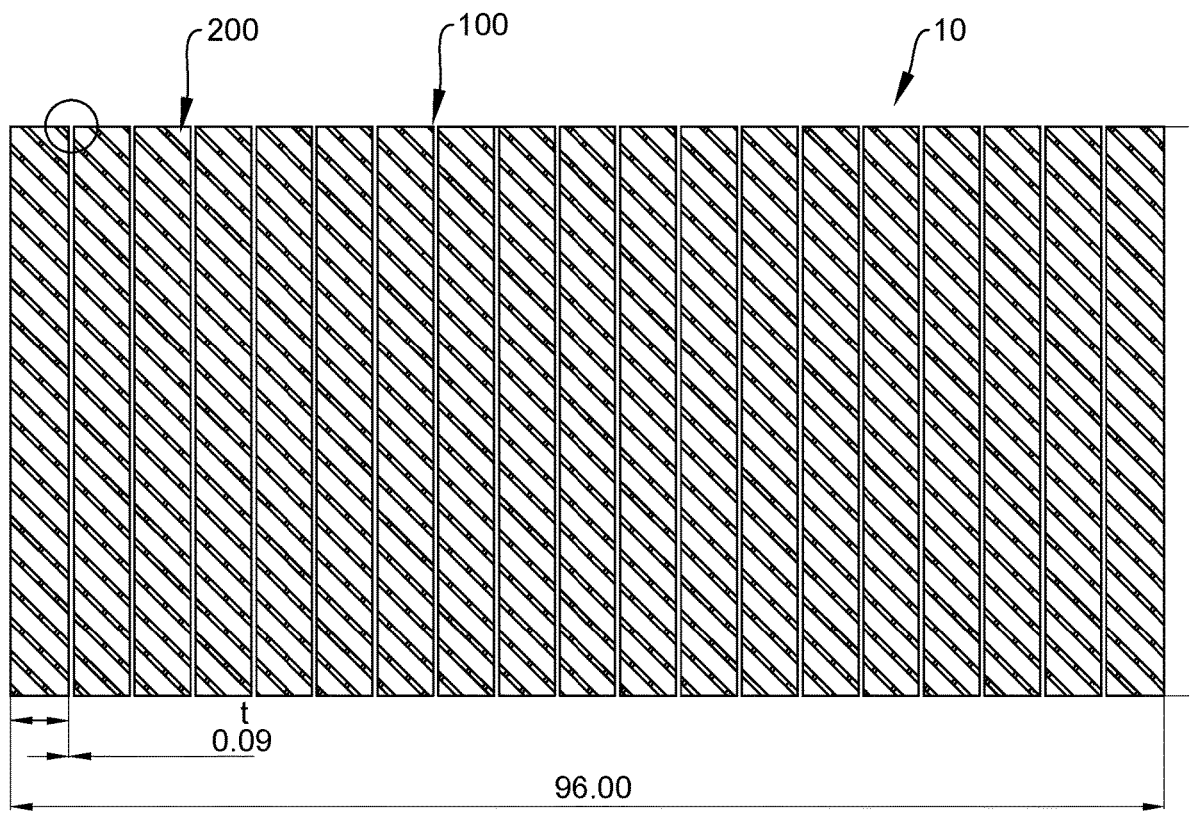
Figure 4:
Figure 5:
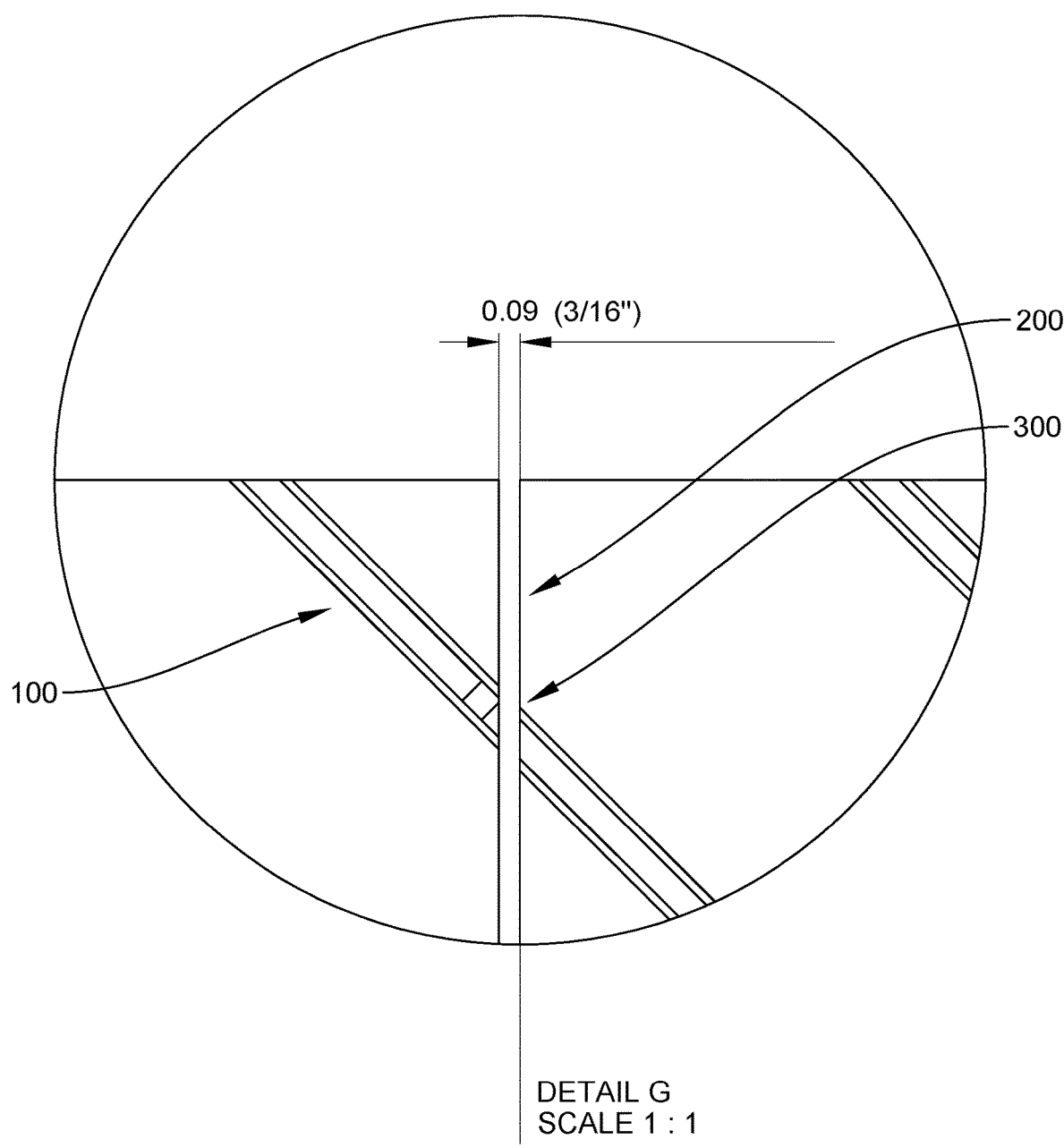

To save on material costs and expedite manufacturing cycle time, a supply source plate (10) can be provided, from which a plurality of removable plastic plates (20) for use in accordance with the disclosed technique can be created. As shown in FIG. 2-4, the supply source plate (10) is provided having approximate dimensions of 96 inches×48 inches×0.25 inches. From this supply source plate (10) a plurality (i.e. 18 in the exemplary embodiment shown) of individual removable plates (20) can be machined or cut for use in accordance with the disclosed technique (a single removable plate (20) being depicted in FIG. 6). A series of score lines or division markers (100) is formed at approximately a 90° angle with respect to the lower edge of the plate (10). As shown, the division markers (100) can be uniformly spaced a distance of approximately 5 inches apart, across the surface of the plate supply source plate (10). In the exemplary embodiment shown, the division markers (100) are formed with an opening or thickness (t) of approximately 0.09 (or 3/16) inches wide.

In accordance with an aspect of the disclosure, the pattern of grooves or channels in each perimeter plates is flexible. In the exemplary embodiments shown in FIGS. 2-14 grooves, or channels, were formed in both sides (i.e. upper and lower surfaces) of each plate employed. This configuration of channels is advantageous in that it allows the plates to be placed in any orientation, and at any location along the mold perimeter. For example, a series of channels (200) can be formed at approximately a 45° angle with respect to the lower edge of the plate. As shown, the channels (200) can be uniformly spaced a distance of approximately 5 inches apart, across the surface of the plate.

Figure 6:
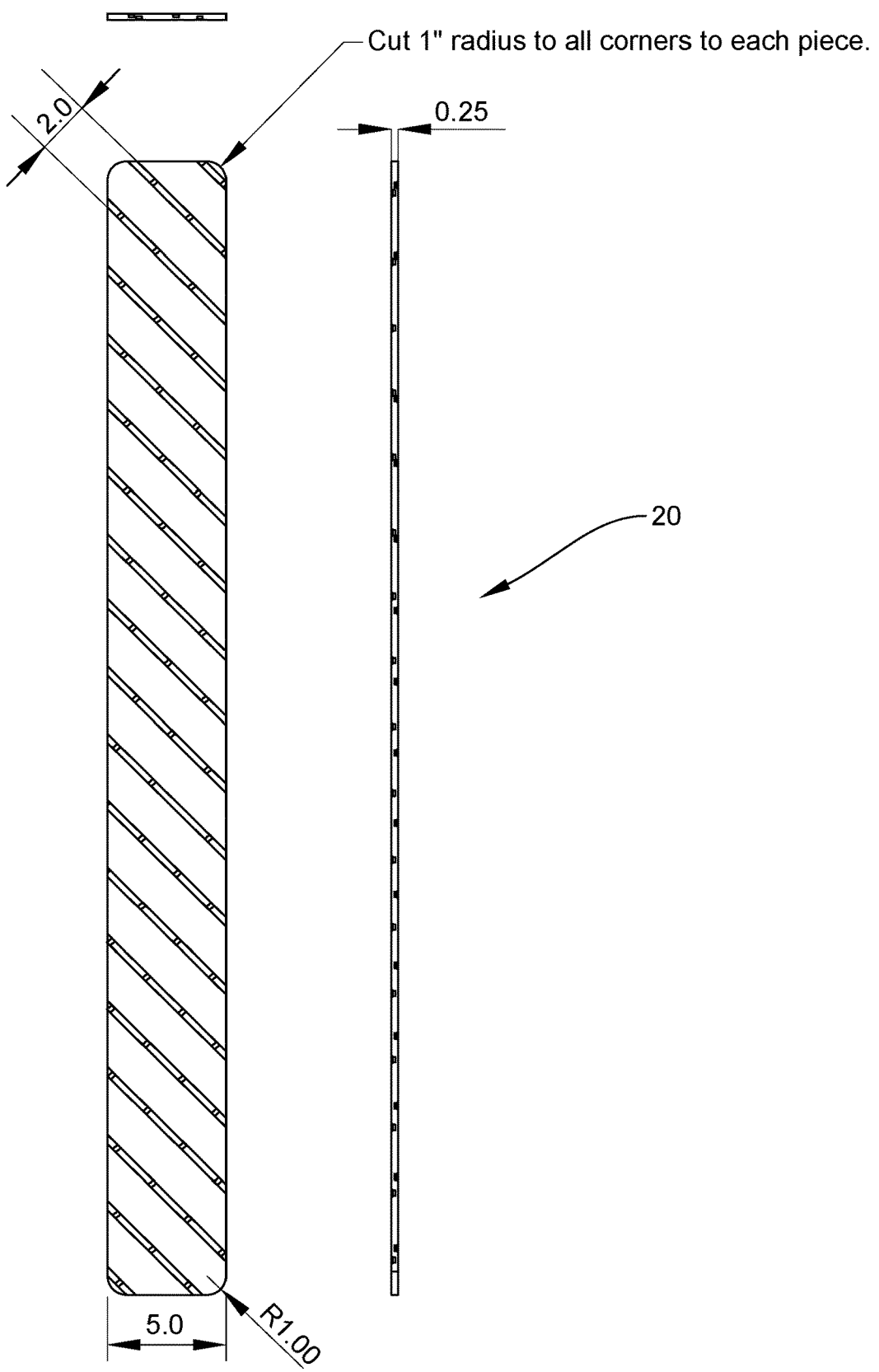
Figure 7:
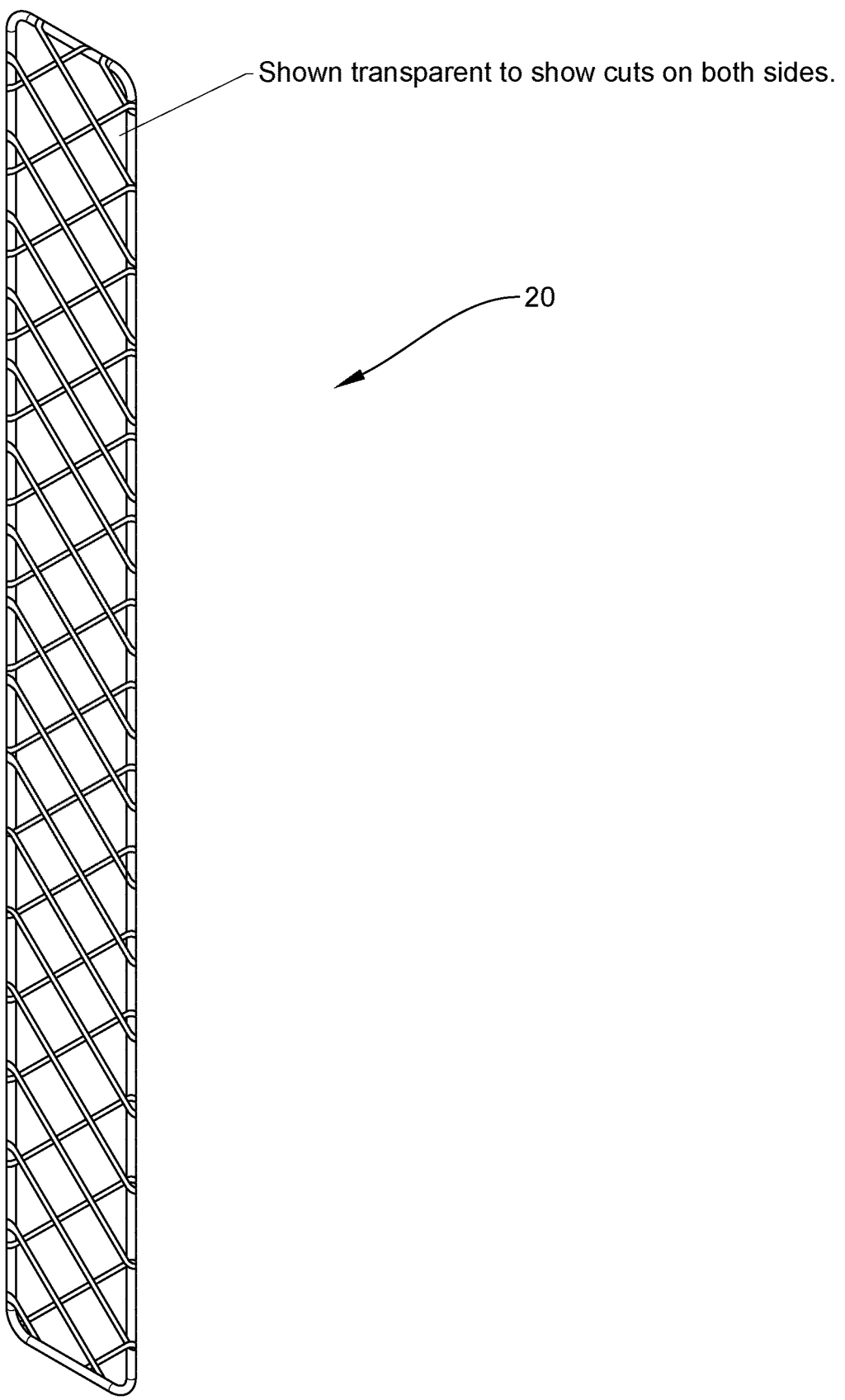
Figure 8:
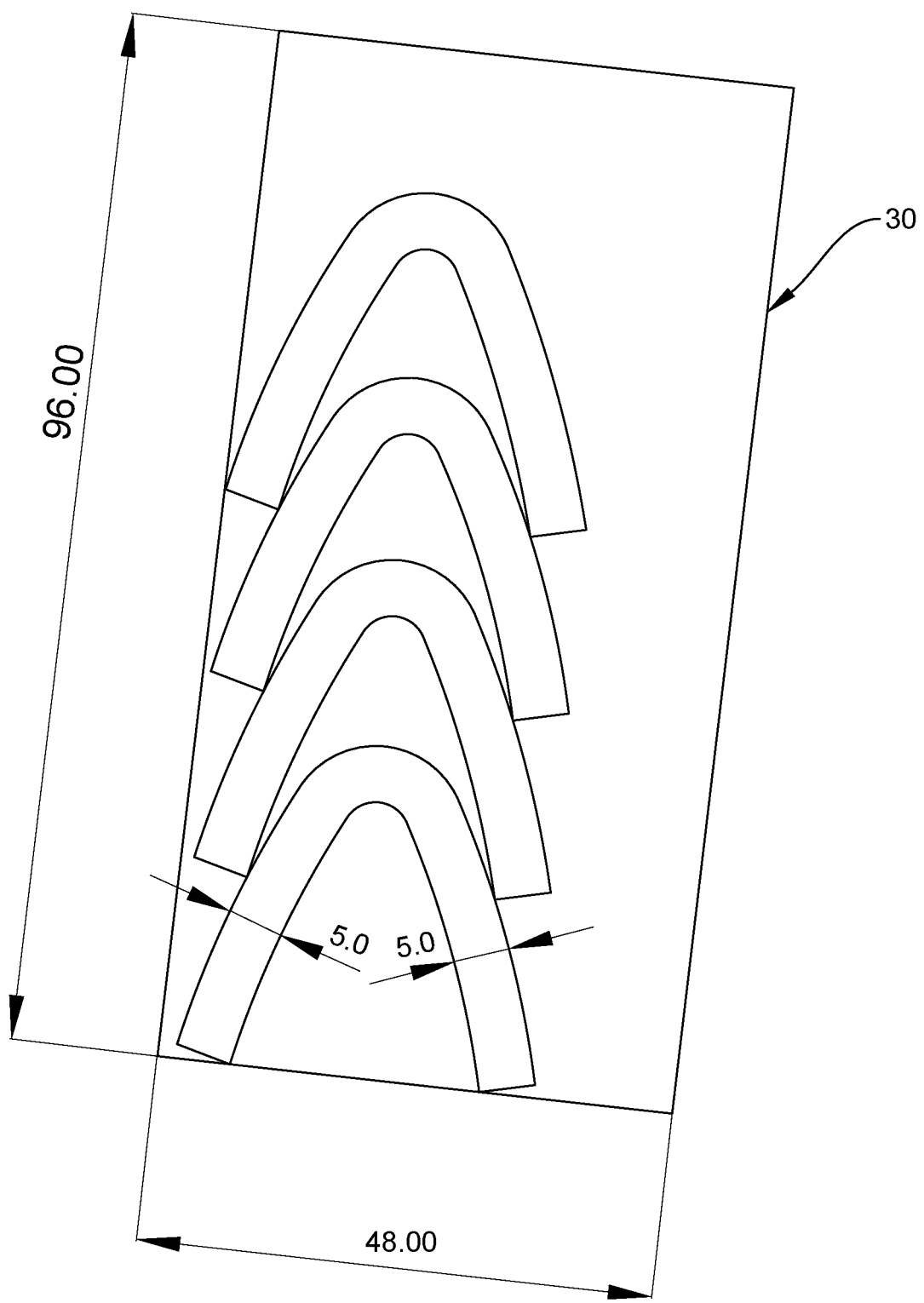
Figure 9:
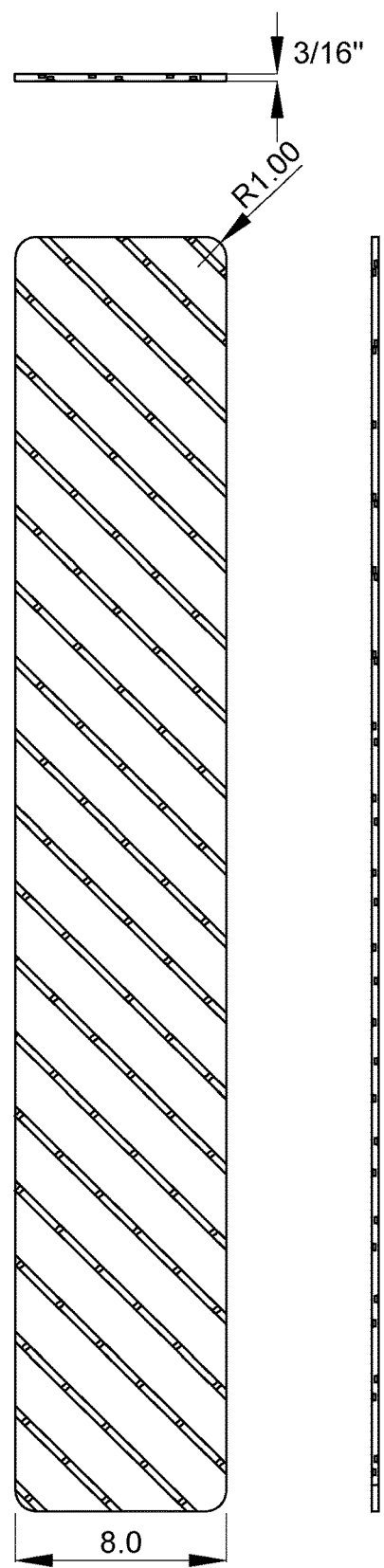
Figure 10:
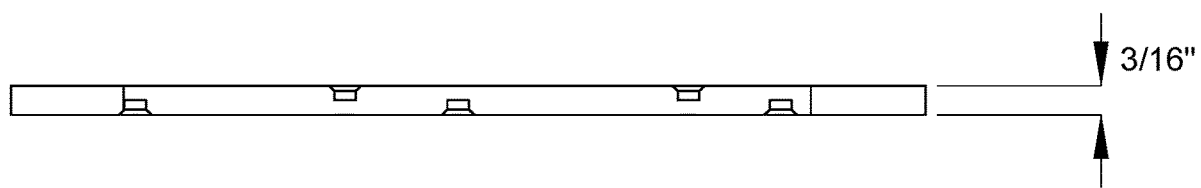
Figure 11:
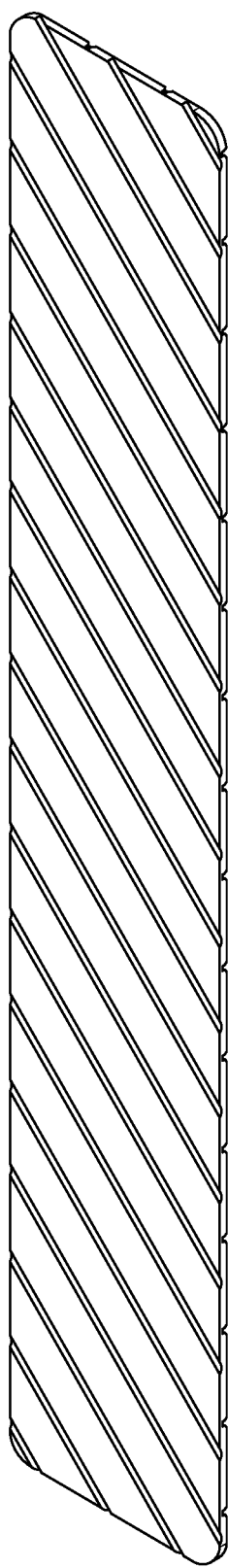

In some embodiments, the channels (200) are all configured with an equivalent depth. However, in some embodiments one set of channels can be formed with a different depth than another set of channels. In some embodiments, the channel depth is half the width of the material from both sides of the material, this allows for through holes at intersections from side to side which allows air to flow through the part from top to bottom. Furthermore, in some embodiments the depth of the channels can vary across the plate, such as randomly or in a discrete pattern (e.g. gradient). As shown, the channels (200) can be uniformly spaced a distance of approximately 2 inches apart, across the surface of the plate, as shown in FIG. 6. In some embodiments, a plurality of channels can be formed on each surface of the plate (20), having a different orientation (e.g. channels having an alternating direction or converging such that they form points of intersection on each surface of the plate. In addition to the exemplary embodiments illustrated, more/less channels, in any orientation, allowing air to flow from part to vacuum ports is permissible within the scope of the present disclosure. Additionally or alternatively, the air flow pathways can be established by creating a series protrusions (e.g. raised bumps) instead of, or in addition to, channels (200).

In accordance with the disclosure, the pattern of grooves or channels in the removable and reusable perimeter plates is adjustable. As shown in FIGS. 13-14, channels (200) are formed in both sides of the plate alternating in direction and intersecting through the plate. As a result a plurality of through holes (202) are formed at the points of intersection which extend through the thickness of the plate. These apertures (202) allow air to be pulled out of the mold and vacuum bag during manufacture of the wind turbine blade. These apertures (202), as well as the channels, are sized such that they inhibit/prohibit the plastic bag from being sucked into the void therein when a vacuum is applied. In some embodiments, the edges of the apertures, and/or channels, can include an O-ring or lip portion to increase the friction between the plate and bag so as to further inhibit/prohibit the bag from being sucked into this void. This allows the plates to be placed in any orientation in any place along the mold perimeter.

Additionally, the ends of the plates are chamfered or rounded to allow contouring around slight curves, as shown in FIG. 6. All channels (200) and sharp edges of the plates (20) are rounded off to prevent holes in the plastic bag that is stretched over them forming the perimeter bag. Typically, each panel (20) is configured to be interchangeable. In addition to the plates (20) which are intended for use around the leading and trailing edges of the blade mold, tip plates (30) can also be formed, which are generally v-shaped and cut to fit a tight radius, see FIG. 8. These tip plates have a series of channels, on both the upper and lower surfaces, which correspond with the channels (200) described above. When installed, the tip plates/pieces abut/engage the leading and trailing edge pieces. In other words, each panel is independent from the other and can be repositioned/removed separate from an adjacent piece. Additionally, the tip pieces are formed with a uniform thickness as the plates, e.g., 0.25 inches.

The removable and reusable plates can be made from, e.g., high-density polyethylene (HDPE), and/or PPG based polyether elastomeric polyurethane. Though it will be understood by artisans of ordinary skill that other materials can be employed. The factors defining the range of suitable materials include cost, durability, resistance to chemicals, heat deflection temperature, water absorption, flexibility, hardness, and cure time.

In operation, for the exemplary blade shown, the removable and reusable plates (20) are used on the high pressure side of the blade and positioned along the trailing edge, tip, and at the 4 meters position (e.g. measured from the root) on the leading edge. The blade design/contour of the particular embodiment shown is configured for use of the plastic plates on the flat surface of the blade. At the 4-meter location along the blade span, on the leading edge of the pressure side shell, the surface transitions between flat, angled, and flat surfaces which requires the more flexible, e.g. silicone, plates to cover this area. For mold geometries in which there is no attached return flange a flat plate can be employed; for mold geometries where there is an attached return flange, and thus a transition in surface contour, a flexible plate is used. Additionally, the removable and reusable plates are used on the suction side of the blade and positioned along both leading edge, trailing edge and tip. In accordance with another aspect of the disclosure, a removable and reusable plate—which is formed of a softer material (e.g. silicone)—can be used on the pressure side from 4 meters to the tip and across the root, and on the suction side across the root. The plastic plates are used on areas that are flat and accommodating to the shape of the mold. The silicone plates are used where the flange and clamp edge of the mold need covered, also in the root where the shape is circular. Given their pliable and flexible nature, the silicone plates contour to the surface of the mold more easily than the plastic plates. For example, FIGS. 14A-B depict a 8 inch wide and 5 foot long silicone plate positioned along the leading edge of the pressure side blade shell, both before vacuum pressure draw down (left side) and after vacuum pressure draw down (right side). As shown, the pliable silicone plate adapts and bend up the clamp edge, up to and over the bond cap flange bolt holts.

In accordance with an aspect of the disclosure, the removable perimeter plates are easily removed from the manufactured part, reduces the consumables used during manufacture, and does not require cutting the vacuum bag, thus reducing the risk of injury. Accordingly, the disclosed process assists in disassembly and removal of equipment and consumables employed during manufacture of composite products.

Figures 12A, 12B, 12C:
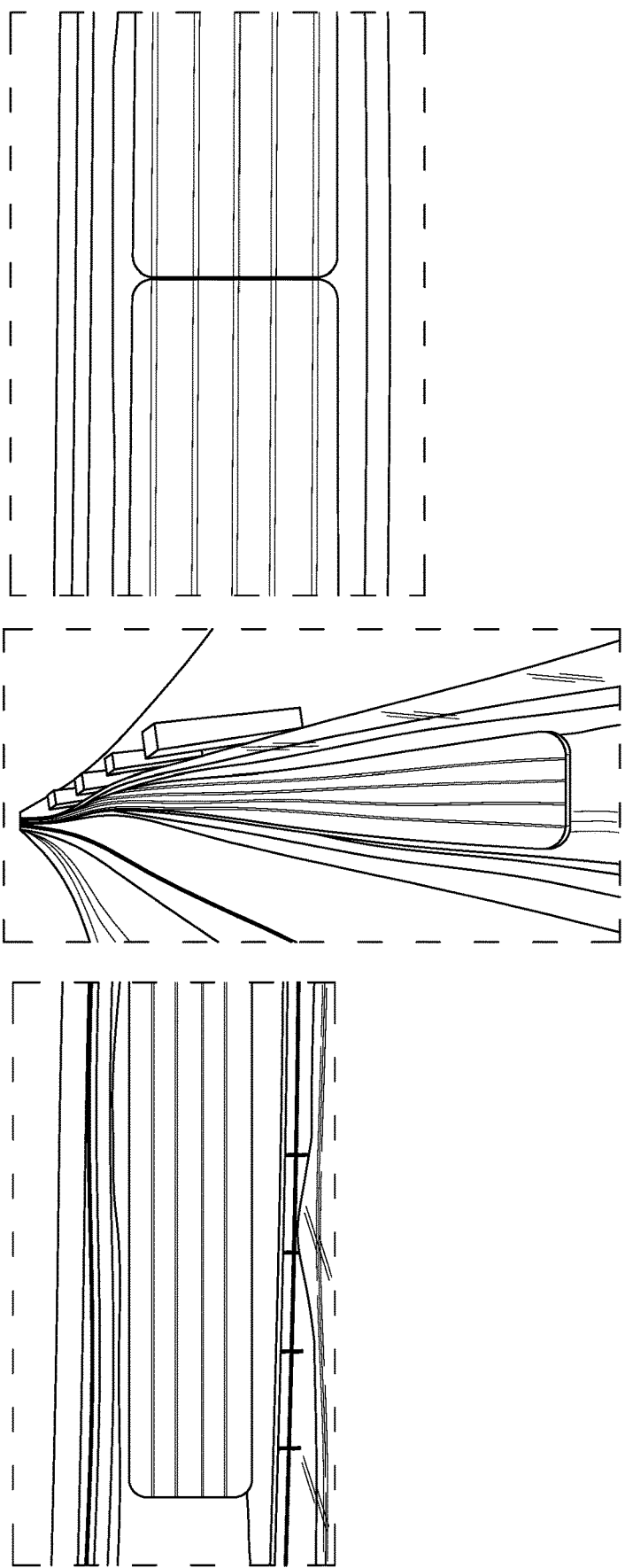

During installation of the reusable perimeter plates, a supply cart which holds and/or dispenses the plates can be stationed external to the mold. The plate dispensing cart can be mobile and positioned alongside the blade mold on the shop floor. Alternatively, the plate dispensing cart can be elevated (either suspended from above, or provided with a scaffold or stilt-like feature to raise it off the shop floor) such that plates can be dispensed and allowed to fall into place under the guidance of a steering mechanism that is part of the dispenser, or by manual placement). In some embodiments, the removable plates are installed on the mold in an abutting side-by-side configuration, as shown in FIGS. 12A-C.

The preferred setting of the presently disclosed technique is in the manufacture of epoxy and polyester resin parts. While the exemplary embodiment focuses on wind turbine blade manufacture, this process can be used in the fabrication of other composite parts e.g., marine, transportation, rides, sculpture, aircraft/military, civil infrastructure, construction, appliance/business, consumer, corrosion-resistant equipment, and electrical component installations.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. An apparatus for forming a wind turbine blade comprising:
   a plurality of removable plates, each plate having an upper and lower surface;
   the removable plates configured to be disposed along at least one of the leading edge and trailing edge of the wind turbine blade mold,
   at least one removable plate of the plurality of removable plates having a plurality of air flow channels formed therein,
      a first channel of the plurality of air flow channels formed in an upper surface and a second channel of the plurality of air flow channels formed in a lower surface, with a through hole formed at an intersection of the first channel and second channel for air to flow through the first plate of the plurality of removable plates;
   wherein the at least one removable plate is configured to establish air flow channels for removal of air within a vacuum bag and blade mold; and
   wherein the at least one removable plate includes a first removable plate on a flat surface of the wind turbine blade mold and a second removable plate disposed adjacent to the first removable plate, with the second removable plate extending from a flat surface of the wind turbine blade mold to an inclined surface of the mold.

2. The apparatus of claim 1, wherein the channels are formed at approximately a 45° angle with respect to a lower edge of the removable plate.

3. The apparatus of claim 1, wherein the channels are uniformly spaced apart across the upper surface of the removable plate.

4. The apparatus of claim 1, wherein at least one channel is formed with a different depth than another channel.

5. The apparatus of claim 1, wherein the channel depth is half the width of the removable plate.

6. The apparatus of claim 1, wherein the depth of a channel varies across the removable plate.

7. The apparatus of claim 1, wherein a plurality of channels in the upper surface are oriented to converge forming points of intersection.

8. The apparatus of claim 1, further including removable tip plates having a generally v-shaped profile, the removable tip plates disposed in an abutting configuration with the at least one removable plate.

9. The apparatus of claim 1, wherein the removable plates are made from at least one of a high-density polyethylene (HDPE), PPG based polyether elastomeric polyurethane and/or combinations thereof.

10. The apparatus of claim 1, wherein the first removable plate remains generally planar during said removal of air.

11. The apparatus of claim 1, wherein the second removable plate conforms to a contoured geometry during said removal of air.

12. An apparatus for forming a wind turbine blade comprising:
    a plurality of removable plates, each plate having an upper and lower surface;
    the removable plates configured to be disposed along at least one of the leading edge and trailing edge of the wind turbine blade mold,
    at least one removable plate of the plurality of removable plates having a plurality of air flow channels formed therein,
       a first channel of the plurality of air flow channels formed in an upper surface and a second channel of the plurality of air flow channels formed in a lower surface, with a through hole formed at an intersection of the first channel and second channel for air to flow through the first plate of the plurality of removable plates;
    wherein the at least one removable plate is configured to establish air flow channels for removal of air within a vacuum bag and blade mold; and
    a vacuum bag, the vacuum bag having a perimeter at least partially sealed with the blade mold; and
    removable tip plates having a generally v-shaped profile, the removable tip plates disposed in an abutting configuration with the at least one removable plate.

13. The apparatus of claim 12, wherein the channels are uniformly spaced apart across the upper surface of the removable plate.

14. The apparatus of claim 12, wherein at least one channel is formed with a different depth than another channel.

15. The apparatus of claim 12, wherein the channel depth is half the width of the removable plate.

16. The apparatus of claim 12, wherein the depth of a channel varies across the removable plate.

17. The apparatus of claim 12, wherein a plurality of channels in the upper surface are oriented to converge forming points of intersection.

18. The apparatus of claim 12, wherein the removable plates are made from at least one of a high-density polyethylene (HDPE), PPG based polyether elastomeric polyurethane and/or combinations thereof.

* * * * *